(No Model.)

T. J. JONES.
APPARATUS FOR CLEANING BOILERS.

No. 244,249. Patented July 12, 1881.

Witnesses.
Ossian R. Terburgh.
T. W. Day

Inventor.
Thomas J. Jones
by James T. Ray
Attorney

UNITED STATES PATENT OFFICE.

THOMAS J. JONES, OF SHARON, PENNSYLVANIA.

APPARATUS FOR CLEANING BOILERS.

SPECIFICATION forming part of Letters Patent No. 244,249, dated July 12, 1881.

Application filed May 19, 1881. (No model.)

*To all whom it may concern:*

Be it known that I, THOMAS J. JONES, of Sharon, in the county of Mercer and State of Pennsylvania, have invented a new and useful Improvement in Apparatus for Cleaning Boilers; and I do hereby declare the following to be a full, clear, and exact description thereof, reference being had to the accompanying drawings, forming a part of this specification, in which—

Figure 1:
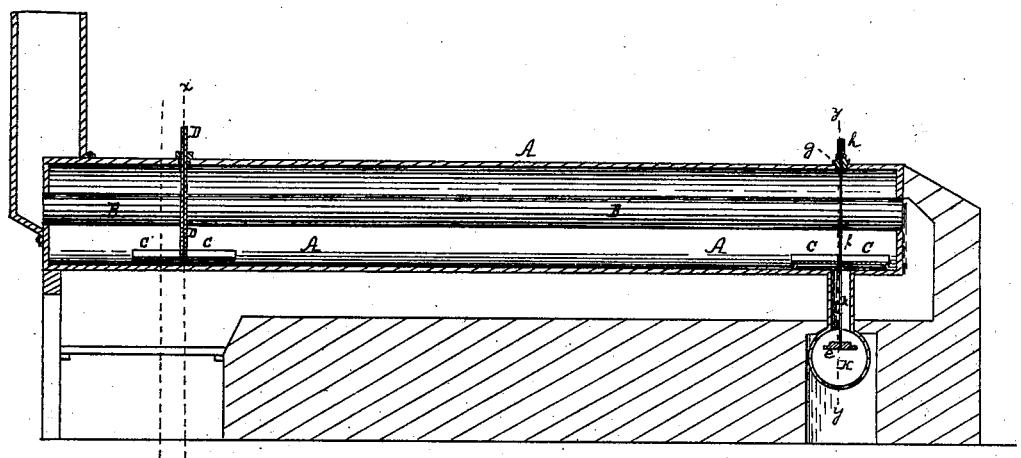
Figure 2:
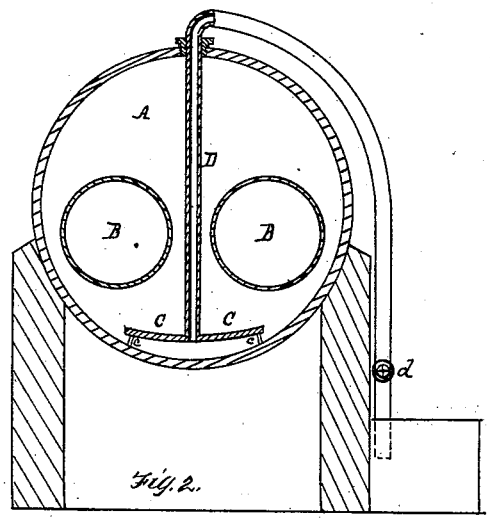
Figure 4:
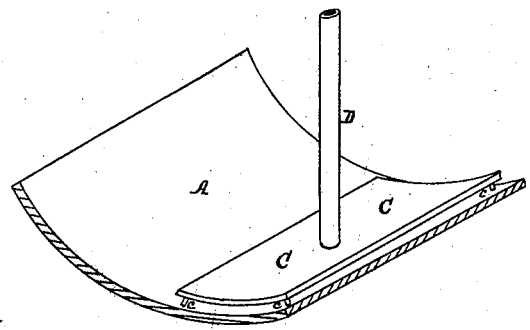
Figure 3:
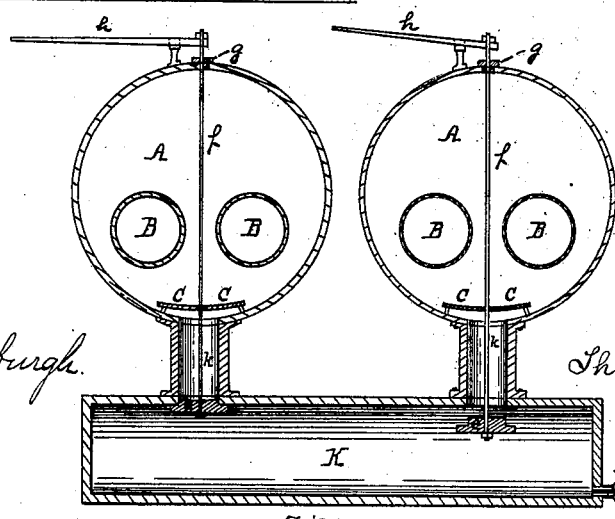

Figure 1 is a longitudinal section of a steam-boiler illustrating my invention. Fig. 2 is a cross-section on the line $x\,x$, Fig. 1. Fig. 3 is a cross-section on the line $y\,y$, Fig. 1; and Fig. 4 is a detached view of my improved apparatus.

Like letters of reference indicate like parts in each.

My invention relates to apparatus for cleaning steam-boilers from the sediment which settles from the water in forming steam.

The water used in forming steam generally contains sand, mud, lime, and other impurities, which gradually settle out of the water to the bottom of the boiler and form a cake or incrustation on the surface of the boiler-plate; and this incrustation prevents the heat from passing through the boiler-plate, so that much more fuel is necessary to generate steam, and the boiler-plate gradually burns out, the plate being so weakened as in some cases to cause explosions.

The object of my invention is to provide means for removing this sediment, and thus preventing the formation of the scale or incrustation in the boiler.

My invention consists in a curved plate or deflector supported in the boiler near the bottom, at the point where the sediment generally gathers, and a blow-off or discharge pipe extending up through the deflector for withdrawing the water from under it, whereby the water, when drawn from the boiler to clean it, will pass around the edges of the plate and form a current, which will wash the sediment from the surface of the boiler under the plate and carry it through the discharge out of the boiler.

To enable others skilled in the art to make and use my invention, I will describe its construction and operation.

My invention is illustrated in connection with a common flue-boiler, though it can be arranged with tubular and other boilers, and will be found to operate equally well.

The boiler A is mounted, in the usual manner, in a furnace, and is provided with the flues B passing through it, and the usual mud-drum, K, at the back end. Where the boilers are arranged in batteries they may be connected in any convenient manner, and the mud-drum may be connected with as many boilers as desired.

In the front of the boiler, above the point where the heat of the furnace has most effect, and consequently where the greatest amount of steam is generated, I arrange the curved plate or deflector C, which is formed of a metal plate bent to the desired shape and supported above the boiler-bottom by the legs $c$. The plate is generally made about three feet long, and should not be over fifteen inches wide, so that it can be passed through the man-hole of the boiler. In a common twenty-six foot boiler I have generally arranged the plate about two and one-half feet from the front of the boiler, this being found to be the hottest point in it. The plate is not curved quite so much as the boiler, and is secured therein so that there is about one inch between it and the bottom of the boiler in the center and about three-fourths of an inch at the side edges, being so secured in order to create a greater longitudinal current than side current in cleaning.

Secured in the center of the deflector C is the blow-off or discharge pipe D, which is a common tube one and one-half or two inches in diameter. The pipe D passes through the deflector, so as to draw the water from beneath it, and may either pass through the top of the boiler, as shown, or through the end, as desired.

When the cleaner is used with a tubular boiler, as the pipes cannot pass between the tubes, it is generally conducted through one end or through the side of the boiler. The pipe then leads to a suitable discharge, and it is provided with a valve, $d$, in convenient position for the engineer, which is opened when it is desired to clean the boiler.

To cleanse the back of the boiler I generally arrange a deflector over the mud-drum K, so as to aid in washing the mud and sediment into the drum. It is formed about the same width, and varies in length according to the location of the drum, one end being arranged within about one-half inch of the back of the boiler and the deflector extending forward a short distance beyond the entrance to the mud-drum, so as to cause a longitudinal scouring-current along the boiler-bottom into the drum. I have obtained the best results with a deflector over the mud-drum of about the same curve as the boiler, and supported about one-half inch above the boiler-bottom.

Where a pair or battery of boilers connects with the same mud-drum, as is often the case, I arrange a valve, $e$, in the entrance $k$ of each boiler into the drum, by means of which the connection between the drum and all boilers excepting the one to be cleaned can be closed, thus causing a strong washing-current around the deflector in that boiler and a thorough scouring thereof. This valve $e$ is most conveniently operated by means of a rod, $f$, extending through a suitable stuffing-box, $g$, at the top of the boiler and through the deflector, though it may be operated through the bottom of the mud-drum. The valve fits into the drum-entrance from below against a suitable seat, and it is not necessary that it close the seat entirely, its only object being to check the current from the boiler into the drum.

The rod $f$ is operated by a suitable lever, $h$, at the top of the boiler.

The mud-drum is provided with a suitable mud-valve, $l$, in the bottom, which is opened to draw off the mud and to cause the current to cleanse the back of the boiler.

The operation of my improved boiler-cleaning apparatus is as follows: During the generation of steam the heat from the furnace causes a circulation of the water, which is generally forward along the bottom of the boiler and backward in the upper part of the water. This circulation of the water causes the gathering of the heavier parts of the sediment in the forward end of the boiler, where the heat is greatest, which sediment, if allowed to remain sufficiently long, forms a hard cake or incrustation, which prevents the passage of heat through the boiler and the generation of steam; and where the boiler is not cleaned this incrustation gradually extends back until the whole bottom of the boiler is covered. The mud and lighter impurities are carried back by the current and gather in the back of the boiler, being drawn off through the mud-drum. Where my cleaning apparatus is employed the sediment is removed before it becomes hard and cakes, and consequently the surface of the boiler is kept clean. In the front of the boiler the agitation of water consequent to the generation of the steam forms a current between the deflector and boiler, which will lift the major portion of the sediment and throw it into the deflector, a portion, however, of the sediment resting on the boiler-surface. When a considerable amount of sediment has gathered the valve $d$ of the discharge-pipe D is opened to blow off the sediment, and the pressure in the boiler forces the water from under the deflector out through the pipe. The water, in order to pass out through the discharge, must pass around under the deflector, which in this way causes a current along the bottom of the boiler, both longitudinally and sidewise, and this current washes the sediment in under the deflector and thoroughly scours the boiler. As the space between the deflector and boiler is greater in the center than at the sides a strong longitudinal washing-current is created, which washes the boiler-surface for several feet beyond the ends of the plate, and as the sediment gathers principally along this bottom surface it is all drawn in under the deflector and carried off. In blowing off, the downward current of the water is deflected out of a direct course to the discharge, and thus scoops out any sediment which may have gathered in the upper surface of the deflector and carries it around under the deflector into the discharge. By placing the deflector at the point where the greatest heat strikes the boiler this portion of the boiler is kept clean, and as the circulation of the water draws the heavier sediment to this portion of the boiler the front half of the boiler is generally kept clean by means of this one deflector.

The operation of the deflector in the rear of the boiler is substantially the same, the only difference being in the direction of the discharge of the sediment after it is drawn under the deflector. Instead of employing a separate pipe for blowing off, the mud and sediment are carried under the deflector and then through the drum-entrance $k$ into the mud-drum K. When this is to be accomplished the mud-valve $l$ is opened and the pressure in the boiler forces the water into the mud-drum. Instead of passing directly into the drum, the plate C deflects the water around it, so as to create a strong scouring-current in the back of the boiler into the drum, in the manner above described. Where there is more than one boiler connected to the drum the entrances to all but the one to be cleaned are closed by their respective valves $e$, as above described, and in this way a strong scouring or cleaning current is created in that one boiler.

By the use of my improved cleaning apparatus two or three times a day the boiler can be kept free from sediment and mud, and the steam consequently generated with much less fuel than where it is allowed to accumulate.

The apparatus is so simple in construction that it can be cheaply applied to any common boiler, and is not liable to become clogged or get out of order.

I am aware that a plate has been arranged over the entrance to the mud-drum of a boiler, and hence do not claim this broadly; but

What I claim as my invention, and desire to secure by Letters Patent, is—

1. In apparatus for cleaning boilers, a curved plate or deflector supported above the boiler-bottom, in combination with a blow-off or discharge pipe extending up through the deflector, so as to cause a scouring-current under the deflector to the blow-off pipe, substantially as and for the purposes set forth.

2. In apparatus for cleaning boilers, arranged in two or more boilers connected with the same mud-drum, the combination of the deflectors C, supported over the discharge-openings between the boilers and mud-drum, and the valves $e$, substantially as and for the purposes set forth.

In testimony whereof I, the said THOMAS J. JONES, have hereunto set my hand.

THOMAS J. JONES.

Witnesses:
WILLIAM G. MORGAN,
WILLIAM H. JONES.